United States Patent
Swenson

(10) Patent No.: US 11,034,197 B2
(45) Date of Patent: Jun. 15, 2021

(54) ALIGNING HITCH DEVICE

(71) Applicant: Clyde Machines, Glenwood, MN (US)

(72) Inventor: Tim Swenson, Glenwood, MN (US)

(*) Notice: Subject to any disclaimer, the term of this patent is extended or adjusted under 35 U.S.C. 154(b) by 140 days.

(21) Appl. No.: 16/580,647

(22) Filed: Sep. 24, 2019

(65) Prior Publication Data

US 2020/0101805 A1  Apr. 2, 2020

Related U.S. Application Data

(60) Provisional application No. 62/739,532, filed on Oct. 1, 2018.

(51) Int. Cl.
*B60D 1/02* (2006.01)
*B60D 1/40* (2006.01)

(52) U.S. Cl.
CPC ............... *B60D 1/025* (2013.01); *B60D 1/40* (2013.01)

(58) Field of Classification Search
None
See application file for complete search history.

(56) References Cited

U.S. PATENT DOCUMENTS

| | | | | |
|---|---|---|---|---|
| 646,961 A * | 4/1900 | Degroff | ............... | B60D 1/02 213/204 |
| 2,476,511 A * | 7/1949 | Ruth | ............... | B60D 1/025 280/515 |
| 2,525,471 A * | 10/1950 | Balzer | ............... | B60D 1/02 280/508 |
| 2,661,444 A | 11/1953 | Cade | | |
| 3,190,677 A | 6/1965 | Robbins | | |
| 4,447,071 A | 5/1984 | Kaplan | | |
| 6,286,852 B1 | 9/2001 | Slatten | | |
| 7,398,987 B2 * | 7/2008 | Roe | ............... | B60D 1/28 280/515 |
| 8,336,902 B2 * | 12/2012 | Terpsma | ............... | B60D 1/02 280/515 |
| 8,708,362 B2 * | 4/2014 | Terpsma | ............... | B60D 1/025 280/515 |
| 9,242,519 B2 * | 1/2016 | Terpsma | ............... | B60D 1/025 |
| 2015/0251505 A1 | 9/2015 | Rodda | | |

FOREIGN PATENT DOCUMENTS

| | | | |
|---|---|---|---|
| CN | 204641293 | 9/2015 | |
| CN | 105691128 | 6/2016 | |
| DE | 202009016178 U1 * | 3/2010 | ............... B60D 1/02 |

* cited by examiner

*Primary Examiner* — Kevin Hurley

(57) ABSTRACT

An aligning hitch device prevents a pin from being lifted inadvertently resulting in undesired disengagement of the hitch connection. The device includes a hitch frame including a guide plate. A hitch pin is slidably coupled to the hitch frame. An index collar has a notch. The hitch pin is slidable to fully clear a hitch space in the hitch frame only when the notch is aligned with and receives the guide plate. A biasing spring extends between the index collar and the hitch frame wherein the biasing spring urges the index collar away from the guide plate.

12 Claims, 7 Drawing Sheets

ALIGNING HITCH DEVICE

CROSS-REFERENCE TO RELATED APPLICATIONS

I hereby claim the benefit under 35 U.S.C. Section 119(e) of United States Provisional application 62/739,532 filed Oct. 1, 2018.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to hitch device and more particularly pertains to a new hitch device for preventing a pin from being lifted inadvertently resulting in undesired disengagement of the hitch connection.

(2) Description of Related Art including information disclosed under 37 CFR 1.97 and 1.98

The prior art relates to hitch device.

BRIEF SUMMARY OF THE INVENTION

An embodiment of the disclosure meets the needs presented above by generally comprising a hitch frame including a guide plate. A hitch pin is slidably coupled to the hitch frame. An index collar has a notch. The hitch pin is slidable to fully clear a hitch space in the hitch frame only when the notch is aligned with and receives the guide plate. A biasing spring extends between the index collar and the hitch frame wherein the biasing spring urges the index collar away from the guide plate.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
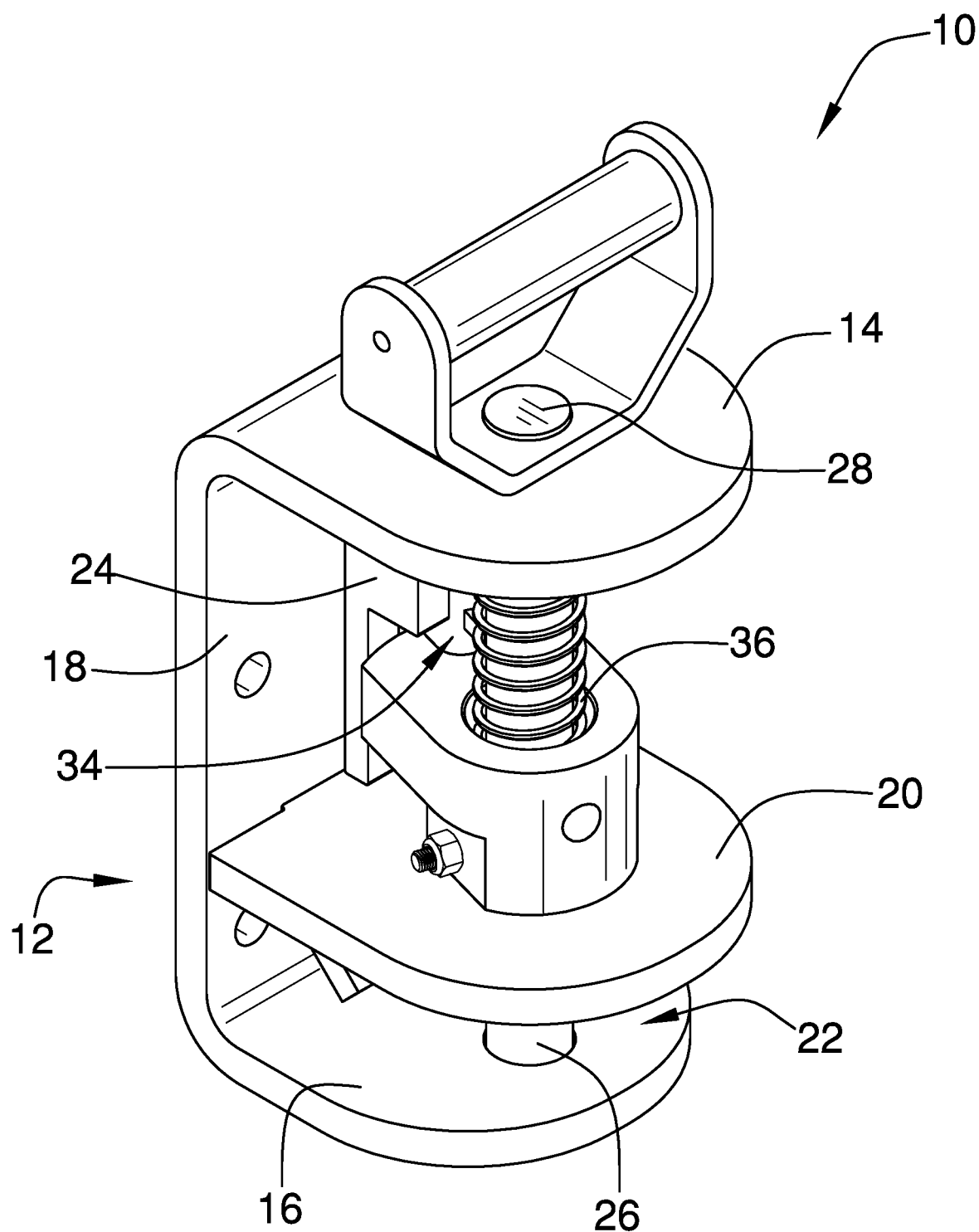
FIG. 1 is a top front side perspective view of a aligning hitch device according to an embodiment of the disclosure.
Figure 2:
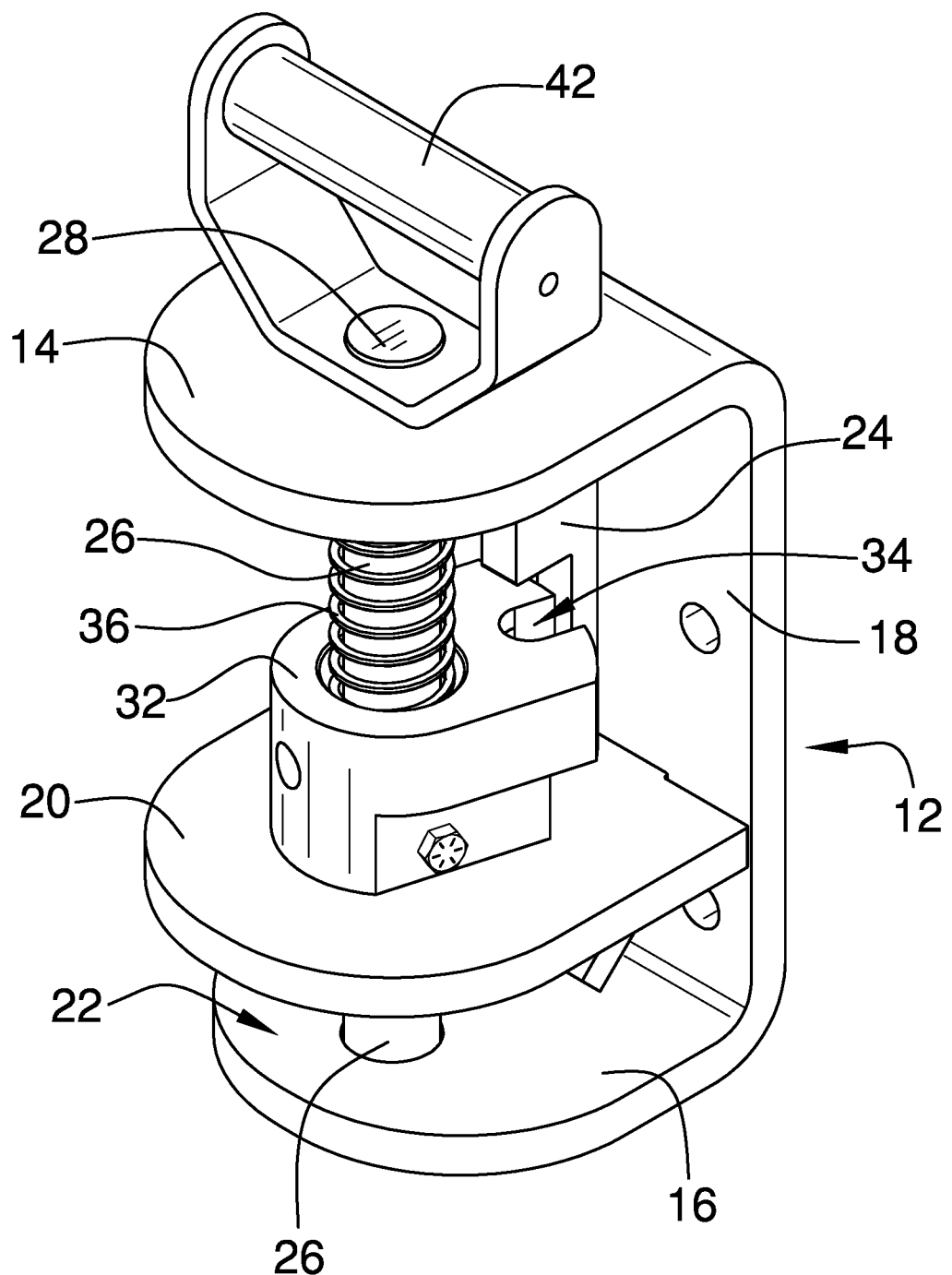
FIG. 2 is a top front side perspective view of an embodiment of the disclosure.
Figure 3:
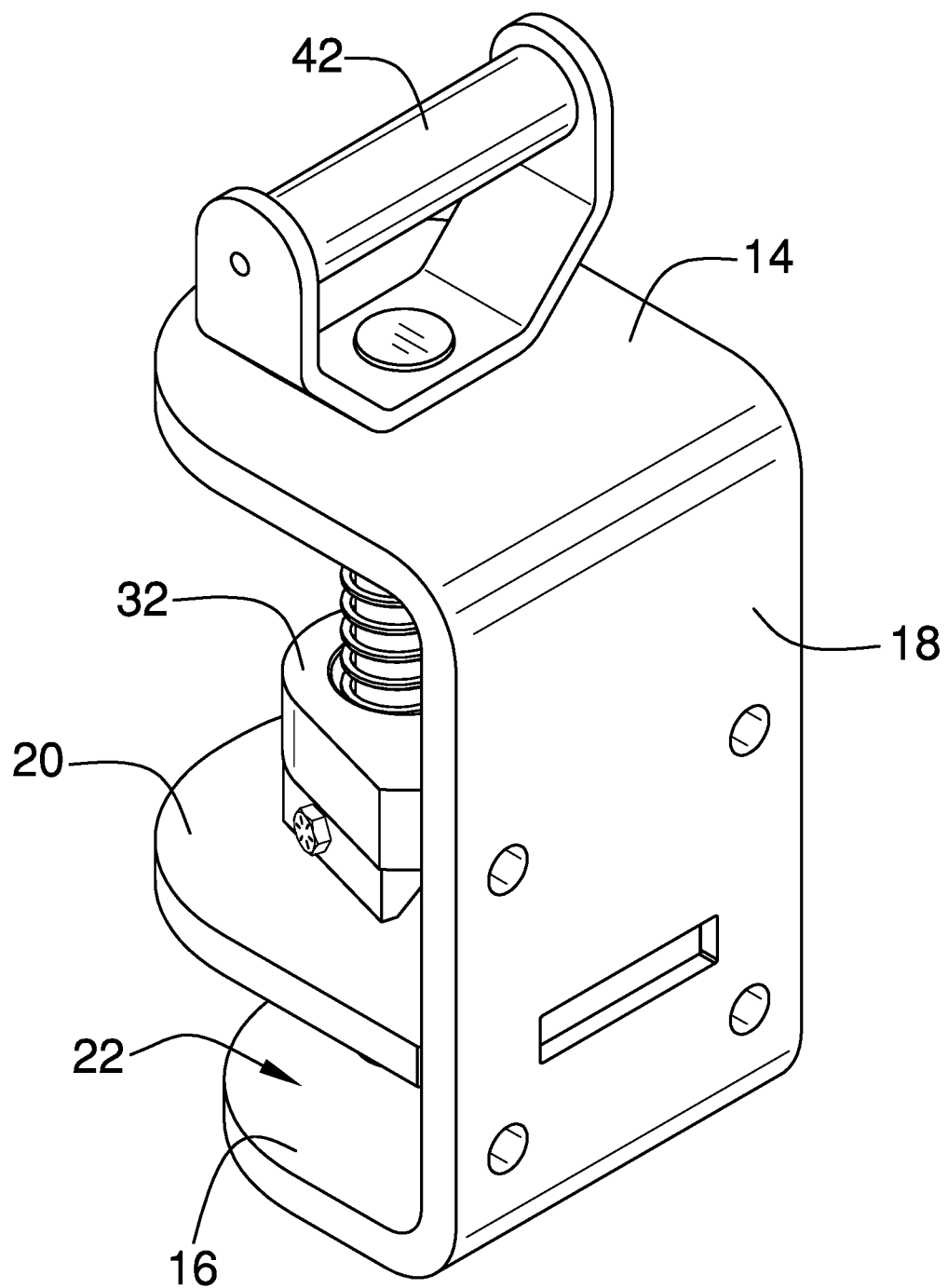
FIG. 3 is a top back side perspective view of an embodiment of the disclosure.
Figure 4:
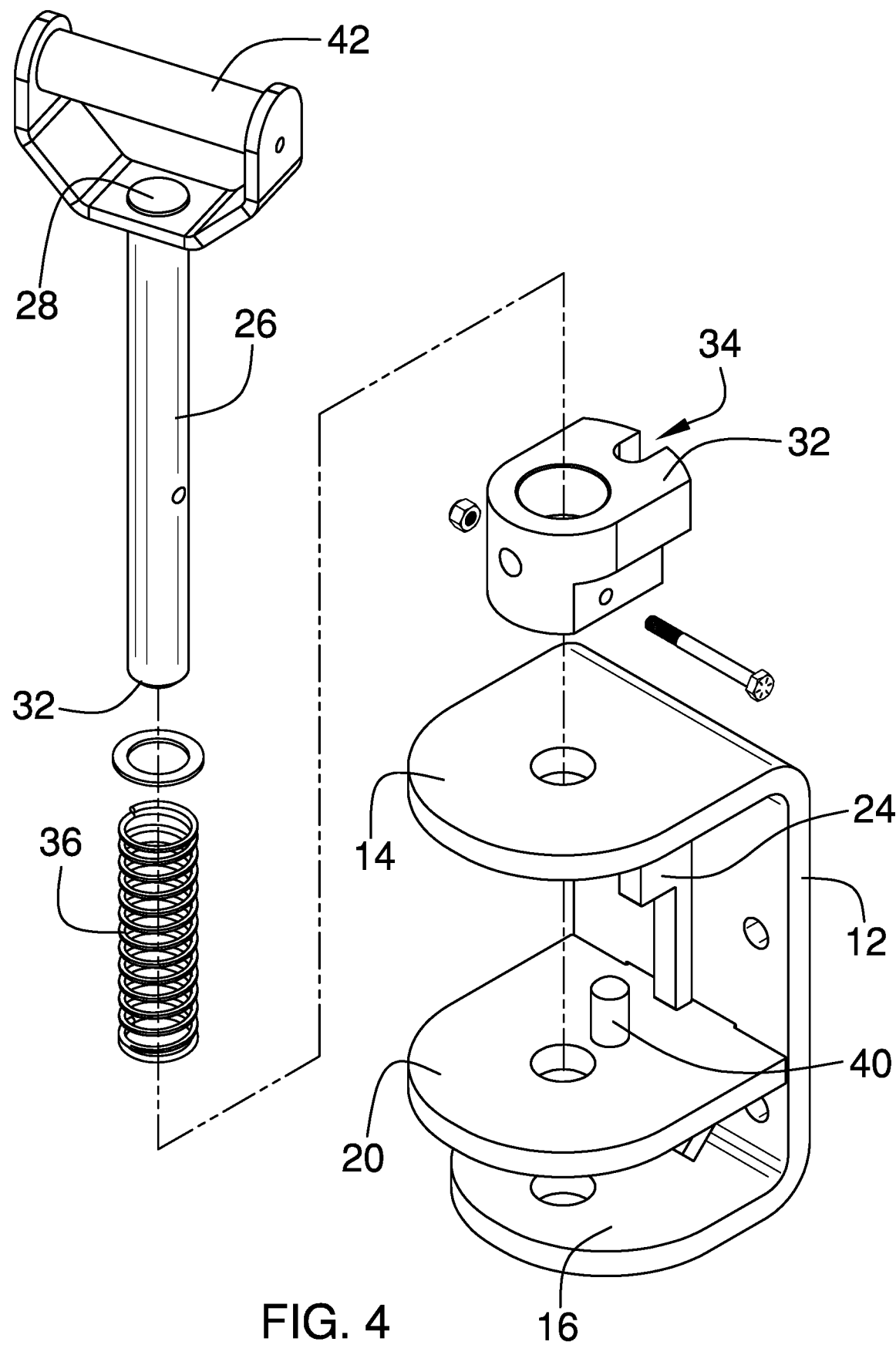
FIG. 4 is a top front side perspective exploded view of an embodiment of the disclosure.
Figure 5:
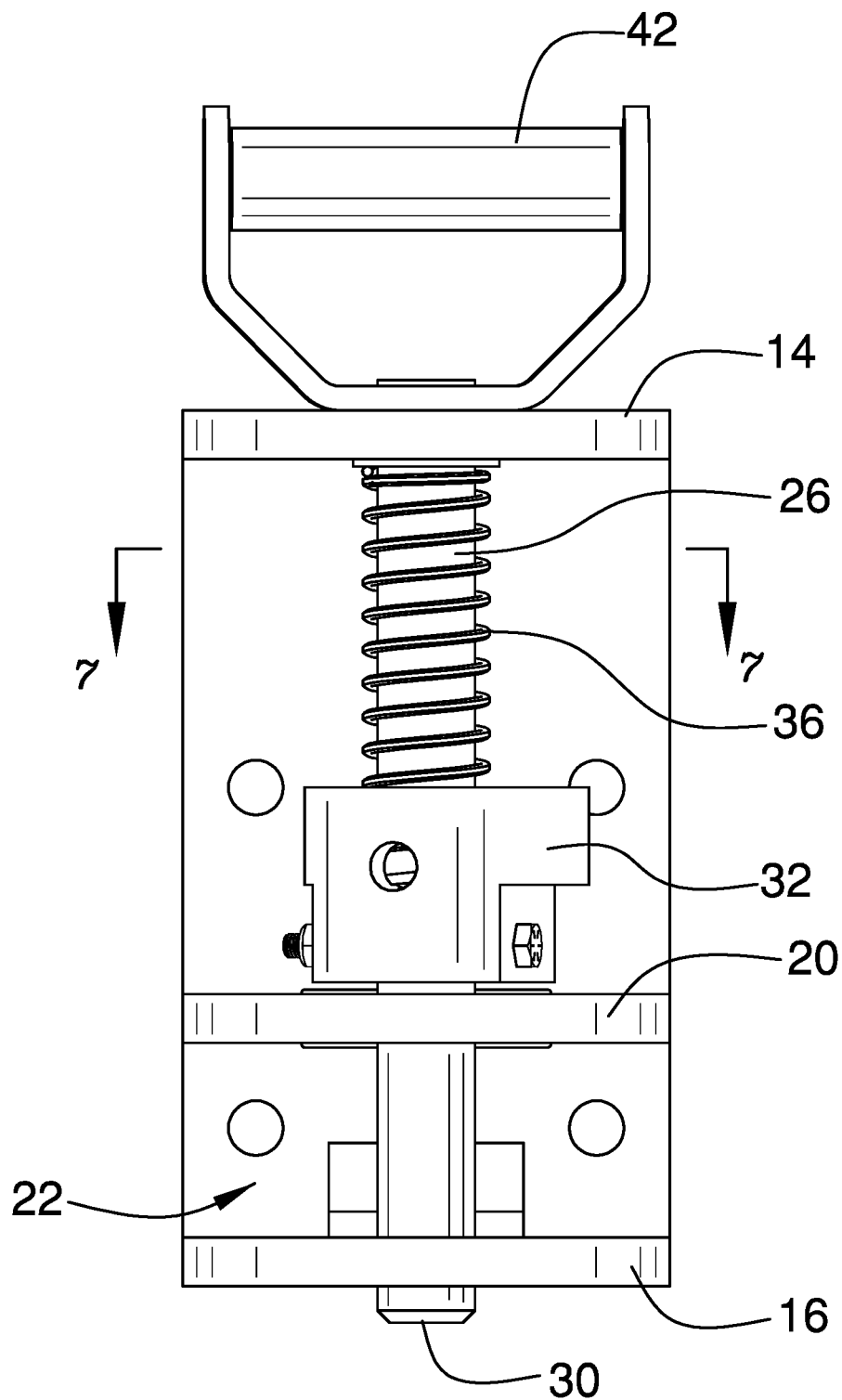
FIG. 5 is a front view of an embodiment of the disclosure.
Figure 6:
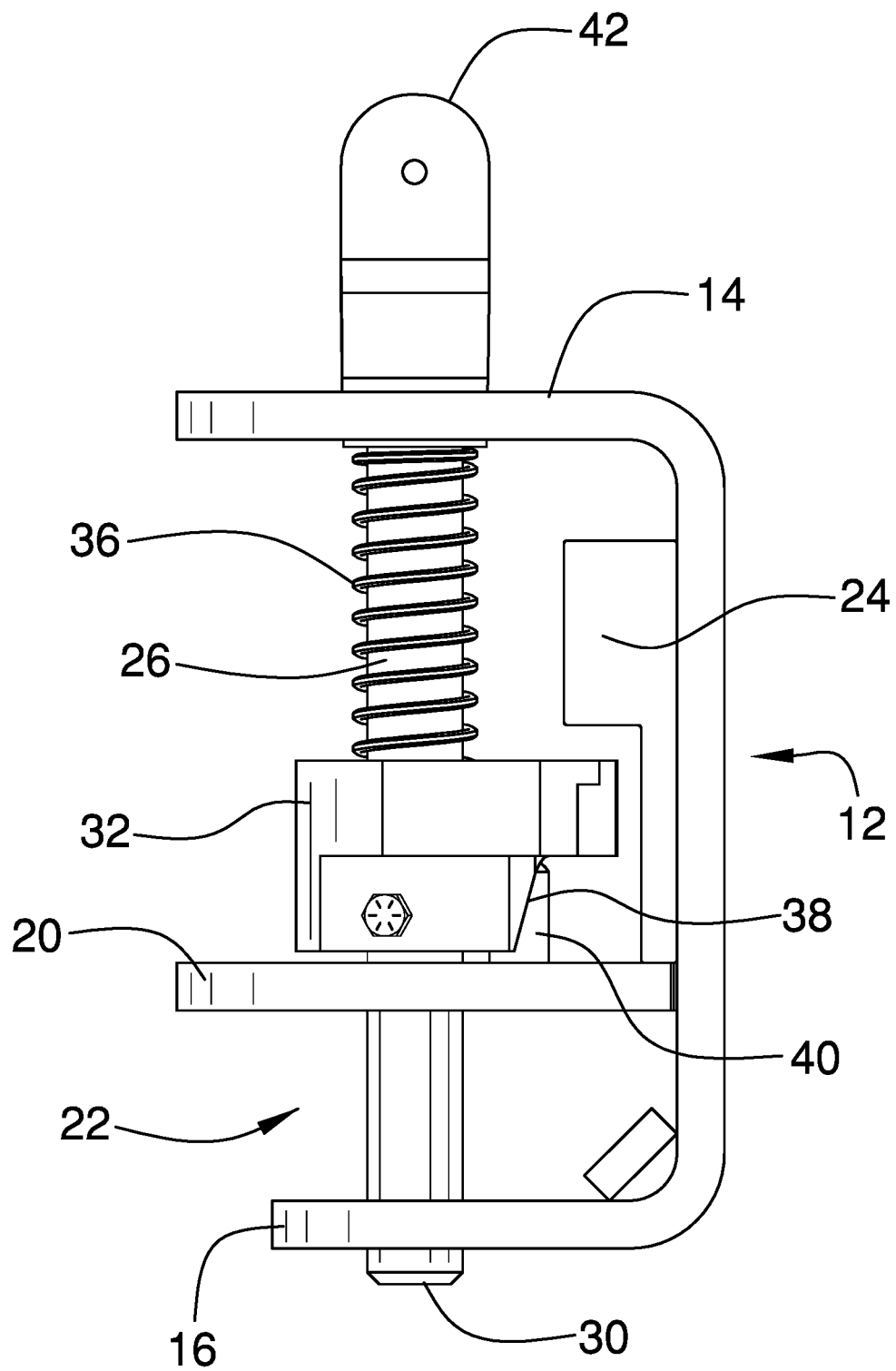
FIG. 6 is a side view of an embodiment of the disclosure.
Figure 7:
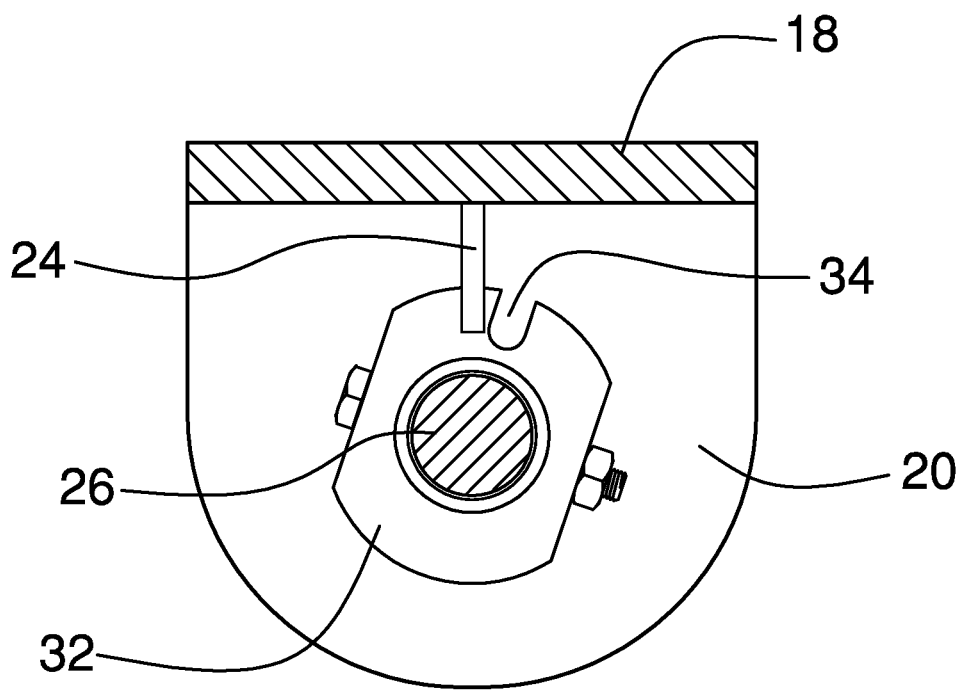
FIG. 7 is a cross-sectional view of an embodiment of the disclosure taken along the line 7-7 of FIG. 5.
Figure 8:
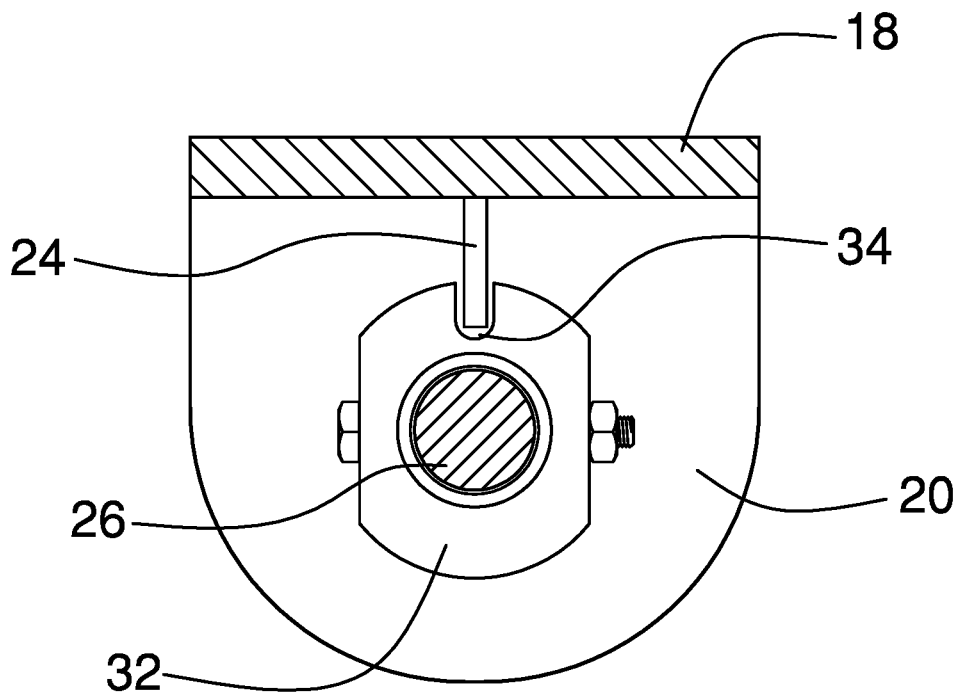
FIG. 8 is a cross-sectional view of an embodiment of the disclosure similar to FIG. 7 showing an alternative position.

With reference now to the drawings, and in particular to FIGS. 1 through 8 thereof, a new hitch device embodying the principles and concepts of an embodiment of the disclosure and generally designated by the reference numeral 10 will be described.

As best illustrated in FIGS. 1 through 8, the aligning hitch device 10 generally comprises a hitch frame 12. The hitch frame 12 includes a top plate 14, a bottom plate 16, and a back plate 18 extending between the top plate 14 and the bottom plate 16. The top plate 14 and the bottom plate 16 are spaced from each other and parallel. The hitch frame 12 includes a medial plate 20 positioned between the top plate 14 and the bottom plate 16. The medial plate 20 is nearer to the bottom plate 16 than to the top plate 14 defining a hitch space 22 between the medial plate 20 and the bottom plate 16. The hitch frame 12 also includes a guide plate 24 coupled to and extending forwardly from the back plate 18 of the hitch frame 12. The guide plate 24 is perpendicular to and positioned between the top plate 14 and the medial plate 20.

A hitch pin 26 is slidably coupled to the hitch frame 12. A top 28 of the hitch pin 26 extends up through the top plate 14 of the hitch frame 12 and a bottom 30 of the hitch pin 26 extends downwardly from the bottom plate 16 of the hitch frame 12. An index collar 32 is coupled to the hitch pin 26 and positioned between the medial plate 20 and the top plate 14. The index collar 32 has a vertical notch 34 selectively alignable with the guide plate 24. The hitch pin 26 is liftable vertically when the notch 34 is aligned with the guide plate 24.

A biasing spring 36 extends between the top plate 14 and the index collar 32. The hitch pin 26 extends through the biasing spring 36 such that the biasing spring 36 urges the index collar 32 towards the medial plate 20. The index collar 32 has a radially sloped surface 38 extending partially around the index collar 32. A post 40 is coupled to the hitch frame 12 extending upwardly from the medial plate 20. The post 40 is aligned with the radially sloped surface 38 such that contact between the post 40 and the radially sloped surface 38 rotates the index collar 32 as the index collar 32 is urged downwardly by the biasing spring 36 extending between the top plate 14 and the index collar 32. The index collar 32 is fully urged by the biasing spring 36 towards the medial plate 20 to define an unlifted position wherein the notch 34 in the index collar 32 is urged to be offset from vertical alignment with the guide plate 24. Thus, the hitch pin 26 can only be disengaged by a combination of rotation and vertical lifting inhibiting unintended disengagement of the hitch device 10. A handle 42 is coupled to the top end 28 of the hitch pin 26 to facilitate grasping, lifting, and rotating the hitch pin 26.

In use, the handle 42 is grasped to lift the hitch pin 26 and rotate the index collar 32 to align the notch 34 with the guide plate 24. When aligned with the guide plate 24, the notch 34 can receive the guide plate 24 allowing the hitch pin 26 to be further lifted such that the hitch space 22 is cleared by the hitch pin 26. An implement to be engaged by the hitch pin 26 can be inserted into the hitch space 22 and the hitch pin 26 released to be biased downwardly engaging the implement. Further, the post 40 abuts the radially sloped surface 38 to rotate the index collar 32 such that the notch 34 is offset from being vertically aligned with the guide plate 24.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hitch device comprising:
   a hitch frame, said hitch frame including a guide plate;
   a hitch pin slidably coupled to said hitch frame;
   an index collar coupled to said hitch pin, said index collar having a notch, said hitch pin being slidable to fully clear a hitch space in said hitch frame only when said notch is aligned with and receives said guide plate; and
   a biasing spring, said biasing spring extending between said index collar and said hitch frame wherein said biasing spring urges said index collar away from said guide plate.

2. The device of claim 1, further comprising:
   said index collar having a radially sloped surface; and
   a post coupled to and extending from said hitch frame, said biasing member urging said radially sloped surface into said post such that said notch is rotated out of alignment with said guide plate as said index collar moves away from said guide plate.

3. The device of claim 1, further comprising said hitch frame including a top plate, a bottom plate, and a back plate extending between said top plate and said bottom plate, said top plate and said bottom plate being spaced from each other and parallel, said hitch frame including a medial plate positioned between said top plate and said bottom plate, said medial plate being nearer to said bottom plate than to said top plate defining said hitch space between said medial plate and said bottom plate.

4. The device of claim 3, further comprising said guide plate being coupled to and extending forwardly from said back plate of said hitch frame, said guide plate being perpendicular to and positioned between said top plate and said medial plate.

5. The device of claim 3, further comprising a top of said hitch pin extending up through said top plate of said hitch frame and a bottom of said hitch pin extending downwardly from said bottom plate of said hitch frame.

6. The device of claim 3, further comprising said index collar being positioned between said medial plate and said top plate, said notch in said index collar being vertical and selectively alignable with said guide plate, said hitch pin being liftable vertically when said notch is aligned with said guide plate.

7. The device of claim 3, further comprising a biasing spring, said biasing spring extending between said top plate and said index collar such that said biasing spring urges said index collar towards said medial plate.

8. The device of claim 7, further comprising said hitch pin extending through said biasing spring.

9. The device of claim 3, further comprising:
   said index collar having a radially sloped surface extending partially around said index collar; and
   a post, said post being coupled to said hitch frame extending upwardly from said medial plate, said post being aligned with said radially sloped surface such that contact between said post and said radially sloped surface rotates said index collar as said index collar is urged downwardly by said biasing spring.

10. The device of claim 9, further comprising said index collar being fully urged by said biasing spring towards said medial plate to define an unlifted position wherein said notch in said index collar is urged to be offset from vertical alignment with said guide plate wherein said hitch pin can only be disengaged by a combination of rotation and vertical lifting inhibiting unintended disengagement of said hitch device.

11. The device of claim 1, further comprising a handle, said handle being coupled to a top end of said hitch pin to facilitate grasping, lifting, and rotating said hitch pin.

12. An aligning hitch device comprising:
   a hitch frame, said hitch frame including a top plate, a bottom plate, and a back plate extending between said top plate and said bottom plate, said top plate and said bottom plate being spaced from each other and parallel, said hitch frame including a medial plate positioned between said top plate and said bottom plate, said medial plate being nearer to said bottom plate than to said top plate defining a hitch space between said medial plate and said bottom plate, said hitch frame including a guide plate being coupled to and extending forwardly from said back plate of said hitch frame, said guide plate being perpendicular to and positioned between said top plate and said medial plate;
   a hitch pin slidably coupled to said hitch frame, a top of said hitch pin extending up through said top plate of said hitch frame and a bottom of said hitch pin extending downwardly from said bottom plate of said hitch frame;

an index collar, said index collar being coupled to said hitch pin and positioned between said medial plate and said top plate, said index collar having a vertical notch selectively alignable with said guide plate, said hitch pin being liftable vertically when said notch is aligned with said guide plate;

a biasing spring, said biasing spring extending between said top plate and said index collar, said hitch pin extending through said biasing spring such that said biasing spring urges said index collar towards said medial plate, said index collar having a radially sloped surface extending partially around said index collar;

a post, said post being coupled to said hitch frame extending upwardly from said medial plate, said post being aligned with said radially sloped surface such that contact between said post and said radially sloped surface rotates said index collar as said index collar is urged downwardly by said biasing spring extending between said top plate and said index collar, said index collar being fully urged by said biasing spring towards said medial plate to define an unlifted position wherein said notch in said index collar is urged to be offset from vertical alignment with said guide plate wherein said hitch pin can only be disengaged by a combination of rotation and vertical lifting inhibiting unintended disengagement of said hitch device; and a handle, said handle being coupled to said top end of said hitch pin to facilitate grasping, lifting, and rotating said hitch pin.

* * * * *